(12) United States Patent
Herr

(10) Patent No.: US 10,506,894 B2
(45) Date of Patent: Dec. 17, 2019

(54) POST MOUNTED GRILL ASSEMBLY

(71) Applicant: Gary W Herr, Cowansville, PA (US)

(72) Inventor: Gary W Herr, Cowansville, PA (US)

( * ) Notice: Subject to any disclaimer, the term of this patent is extended or adjusted under 35 U.S.C. 154(b) by 145 days.

(21) Appl. No.: 15/853,238

(22) Filed: Dec. 22, 2017

(65) Prior Publication Data
US 2018/0116455 A1 May 3, 2018

(51) Int. Cl.
*F24B 3/00* (2006.01)
*A47J 37/07* (2006.01)
*A47J 33/00* (2006.01)

(52) U.S. Cl.
CPC .......... *A47J 37/0786* (2013.01); *A47J 33/00* (2013.01); *A47J 2037/0795* (2013.01)

(58) Field of Classification Search
CPC . A47J 37/0786; A47J 2037/0795; A47J 33/00
See application file for complete search history.

(56) References Cited

U.S. PATENT DOCUMENTS

| 4,688,686 | A | * | 8/1987 | Mitts | .................... | A47B 49/006 |
| | | | | | | 211/183 |
| 2008/0168976 | A1 | * | 7/2008 | Simsack | ................. | A47J 33/00 |
| | | | | | | 126/30 |

* cited by examiner

*Primary Examiner* — Jason Lau
(74) *Attorney, Agent, or Firm* — Barry Choobin; Patent 360

(57) ABSTRACT

The embodiments herein provide a post mounted grill assembly comprising of a post for vertical mounting in the ground and a grill assembly configured for resting on top of the ground embedded post. The grill assembly comprises a pipe, a load screw and a cooking frame. Grill assembly is rested on top of ground embedded post by sliding over bottom end of pipe onto upper end of the post. Load screw enables user to adjust height of grill assembly by turning clockwise to raise and counter clockwise to lower grill assembly. The grill assembly is 360 degrees rotatable in either direction using a second handle attached to pipe for loading fuel to campfire, for turning over food that is cooking and for returning cooking assembly back to campfire to resume cooking. Dismantling of grill assembly is done by lifting grill assembly off the embedded post on completion of cooking.

11 Claims, 11 Drawing Sheets

600

800

POST MOUNTED GRILL ASSEMBLY

BACKGROUND

Technical Field

The embodiments herein are generally related to the field of cooking grills. The embodiments herein are particularly related to post mounted cooking grills. The embodiments herein are more particularly related to a post mounted grill assembly that is free to rotate around the post as well as up and down.

Description of the Related Art

Use of grill assemblies for cooking food over an open fire is well known in the art. Due to an ever-increasing interest in travel and camps, cooking grills that are light-weight, adjustable, easy to erect and easy to carry are preferred by the users. Outdoor cooking grills are often of similar design, usually comprising a vertical support post with an attached grill assembly. The grill assemblies are often designed to be removably mounted upon the support post. In a typical set-up, the post is driven into the ground at the camp fire site by hammering the top of the post and the grill assembly is then attached to the post.

Typically, in outdoor grills, food is placed on the grill assembly which is mounted above a heat source (open fire). The grill assemblies are usually positioned on top of the heat sources for maximum utilization of the heat source. Thus, the position of grill assembly is fixed on the mounting post and cannot be changed during cooking. However, this sometimes leads to charring of the food placed on the grill assembly due to direct heat. This also increases the chances of flare ups in the food when any oily substance is directly placed for heating. Further, in some cases, for achieving desired taste, the food needs to be cooked on a low flame which becomes difficult due to direct exposure of the grill assembly to the heat source.

Additionally, there are some grill assemblies which are rotatable and adjustable in height. These types of grill assemblies are rotated away from fire when needed during cooking. Also, the height of the grill assembly is adjusted for getting appropriate heat exposure needed for the food under cooking. However, these grill assemblies do not offer features such as durability, ease and convenience of achieving the rotation and height adjustment.

Hence, there is a need for a post mounted grill assembly that is freely rotated around the post as well as up and down. There is also a need for a post mounted grill assembly that is freely rotated 360 degrees around the post and is height adjustable in a convenient and easy manner during cooking. Further, there is a need for a post mounted grill assembly that provides an easy solution to flair ups by swinging the grill away from the fire, while at the same time maintains even cooking of the food. Further, there is a need for a heavy duty post mounted grill for permanent camp sites.

The above mentioned shortcomings, disadvantages and problems are addressed herein and which will be understood by reading and studying the following specification.

OBJECTS OF THE EMBODIMENTS

The primary object of the embodiments herein is to provide a post mounted grill assembly that is freely rotated around the post and moved vertically up and down.

Another object of the embodiments herein is to provide a post mounted grill assembly that is freely rotated around the post and moved vertically up and down in a convenient and simple manner during cooking.

Yet another object of the embodiments herein is to provide a post mounted grill assembly that is rotated through 360 degrees in either direction and is raised and lowered by just turning a load screw in either direction.

Yet another object of the embodiments herein is to provide a post mounted grill assembly that provides an easy solution to flair ups by swinging the grill away from the fire while at the same time, maintains cooking of the food evenly.

Yet another object of the embodiments herein is to provide a post mounted grill assembly that is readily swung laterally and rotated about a horizontal axis during cooking operations.

Yet another object of the embodiments herein is to provide a post mounted grill assembly that is easily assembled and dismantled quickly without requiring any skilled man power.

Yet another object of the embodiments herein is to provide a post mounted grill assembly that facilitates rotating the food away from the fire to safely turn food over without working directly over an open fire and then spin the grill back over the fire to continue cooking thereby reducing the possibility of injury to the user.

Yet another object of the embodiments herein is to provide a post mounted grill assembly that facilitates spinning of the grill assembly away to allow a full access to add wood or stir coals in the fire pit.

Yet another object of the embodiments herein is to provide a post mounted grill assembly that is easily dismantled by simply lifting it off the buried post and setting it aside thereby leaving the fire pit/campfire completely unobstructed except the post buried in the ground.

Yet another object of the embodiments herein is to provide a post mounted grill assembly that enables the user to raise, lower, or swivel the cooking surface without touching it thereby reducing the possibility of being burned.

Yet another object of the embodiments herein is to provide a post mounted grill assembly that is strong enough to hold large pots to boil water or to make liquid foods such as soups and stews.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a post mounted grill assembly. The post mounted grill assembly comprises a post for vertical mounting. The post comprises a lower ground penetrating end and an upper end. The upper end of the post is closed by welding a cap. The lower ground penetrating end of the post is embedded in the ground. The post mounted grill assembly also comprises a grill assembly configured for resting on top of the ground embedded post. The grill assembly comprises a pipe comprising of a washer welded onto a top end of the pipe. A nut is welded onto the washer with the threads of the nuts lined up with an opening in the washer. The pipe is configured for sliding onto the upper end of the post from a bottom end of the pipe. The grill assembly also comprises a load screw threaded through the nut at the top end of the pipe. A first handle is welded onto one end of the load screw in a perpendicular fashion. A wooden handle is affixed to the open end of the first handle using a bolt. The grill assembly further comprises a cooking frame attached to the lower end of the pipe. The cooking frame is constructed using a rectangular frame of plurality of square tubes or tubings. The cooking frame is welded directly to the bottom end of the pipe using two or more short sections of square tubes or tubings welded between the cooking frame and the pipe. Alternately, a piece of channel is welded to the bottom of the pipe and the cooking frame is bolted to the pipe using (5/16 inch) bolts through the channel and through the (1 inch) square tubing(s) that is welded to the cooking frame. The cooking frame is configured for holding a cooking grill.

According to an embodiment herein, the post mounted grill assembly further comprises a second handle attached to the pipe. The second handle is configured for allowing the user to swivel the grill assembly towards or away from the fire as per requirement.

According to an embodiment herein, the second handle is mounted onto the pipe at a 40 degree angle from a center line of the cooking grill.

According to an embodiment herein, the grill assembly is configured for rotating through 360 degrees in either direction using the second handle.

According to an embodiment herein, the second handle is foldable when not in use.

According to an embodiment herein, the bolt is configured for passing through the wooden dowel for attaching the wooden dowel to the first handle. The wooden dowel is configured for spinning around the bolt.

According to an embodiment herein, the load screw is configured for enabling the user to adjust the height of grill assembly by turning the screw in a clockwise direction to raise the grill assembly and in counter clockwise direction to lower the grill assembly.

According to an embodiment herein, the grill assembly height is adjusted by a desired amount for a pre-specified number of turns on the load screw in clockwise or counter clockwise direction.

According to an embodiment herein, the post mounted grill assembly further comprises a reinforcing pipe welded between the bottom of the cooking frame and to the bottom of the mounting frame. Alternately, a piece of channel is welded to the bottom of the pipe and the cooking frame is bolted to the pipe using (3/8") inch bolts through the channel and through the (1 inch) square tubing(s) that is welded to the cooking frame.

According to an embodiment herein, the post mounted grill assembly is configured for enabling the user to dismantle the post mounted grill assembly by lifting off the grill assembly from the ground embedded post. Dismantling of the grill assembly form the embedded post provides an unobstructed access of a campfire to the user except the post buried in the ground.

According to an embodiment herein, the dimensions of the post mounted grill assembly are configurable or scalable according to user requirement.

According to an embodiment herein, a method of using the post mounted grill assembly is provided. The method comprises the steps of setting up a grill assembly resting on top of a ground embedded post. The grill assembly comprises a pipe, a load screw and a cooking frame. The method also comprises adjusting height of the grill assembly over the post by turning the load screw in clockwise direction to raise the grill assembly and in counter clockwise direction to lower the grill assembly. The method further comprises swiveling the grill assembly in either direction using a second handle attached to the pipe for loading fuel to the cooking fire/campfire, for turning over food that is cooking. The method still further comprises returning the cooking assembly back to the campfire using the second handle to resume cooking and dismantling the grill assembly by lifting the grill assembly off the embedded post on completion of cooking.

According to an embodiment herein, the step of setting up a grill assembly resting on top of a ground embedded post further comprises sliding over the bottom end of the pipe onto the upper end of the ground embedded post.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1A:
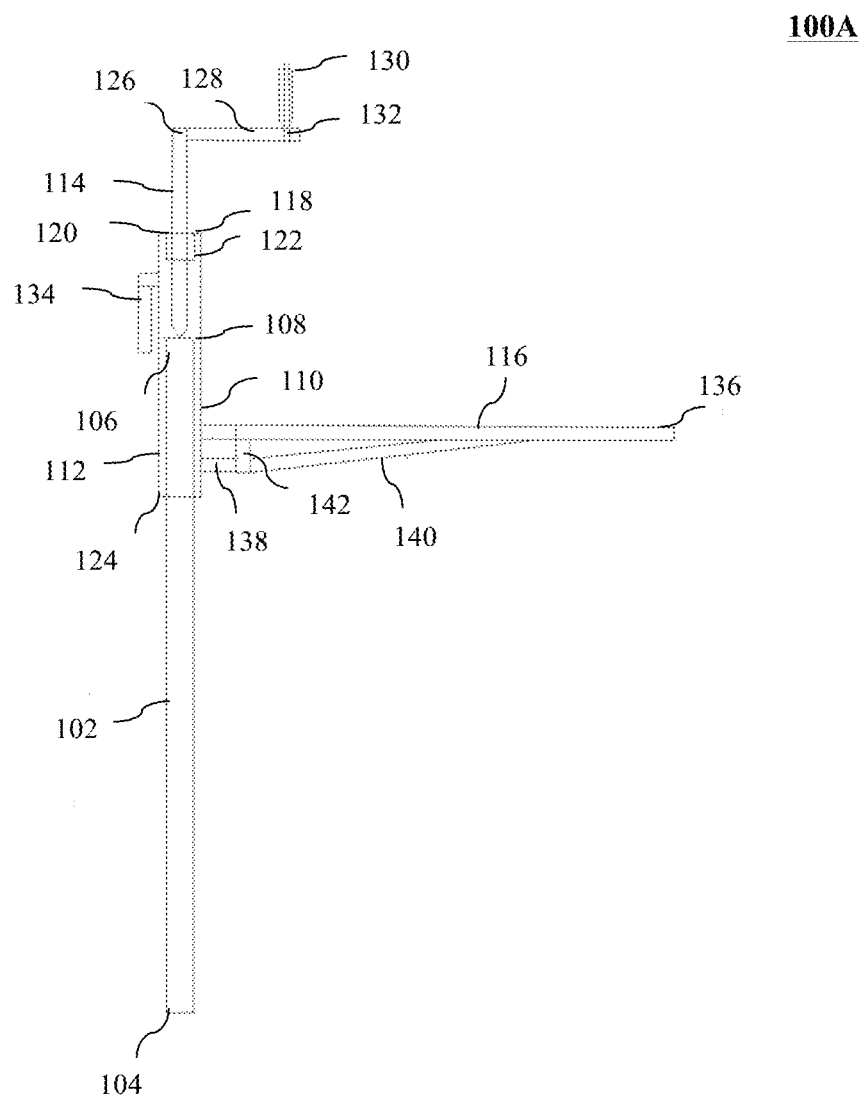
FIG. 1A illustrates a side view of a post mounted grill assembly, according to one embodiment herein.

Although the specific features of the present invention are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a post mounted grill assembly. The post mounted grill assembly comprises a post for vertical mounting. The post comprises a lower ground penetrating end and an upper end. The upper end of the post is closed by welding a cap. The lower ground penetrating end of the post is embedded in the ground. The post mounted grill assembly also comprises a grill assembly configured for resting on top of the ground embedded post. The grill assembly comprises a pipe comprising of a washer welded onto a top end of the pipe. A nut is welded onto the washer with one or more threads of the nuts lined up with an opening in the washer. The pipe is configured for sliding onto the upper end of the post from a bottom end of the pipe. The grill assembly also comprises a load screw fastened to the nut at the top end of the pipe. A first handle is welded onto one end of the load screw in a perpendicular fashion. A wooden handle is affixed to the open end of the first handle using a bolt. The grill assembly further comprises a cooking frame attached to the lower end of the pipe. The cooking frame is constructed using a rectangular frame of plurality of square tubes or tubings. The cooking frame is welded to the bottom end of the pipe using one or more short sections of square tubes or tubings welded between the cooking frame and the pipe. Alternately, a piece of channel is welded to the bottom of the pipe and the cooking frame is bolted to the pipe using (⅜") bolts through the channel and through the (1 inch) square tubing(s) that is welded to the cooking frame. The cooking frame is configured for holding a cooking grill.

According to an embodiment herein, the post mounted grill assembly further comprises a second handle attached to the pipe. The second handle is configured for allowing the user to swivel the grill assembly towards or away from the fire as per requirement.

According to an embodiment herein, the second handle is mounted onto the pipe at a 40 degree angle from a center line of the cooking grill.

According to an embodiment herein, the grill assembly is configured for rotating through 360 degrees in either direction using the second handle.

According to an embodiment herein, the second handle is foldable when not in use.

According to an embodiment herein, the bolt is configured for passing through the wooden dowel for attaching the wooden dowel to the first handle. The wooden dowel is configured for spinning around the bolt.

According to an embodiment herein, the load screw is configured for enabling the user to adjust the height of grill assembly by turning the screw in a clockwise direction to raise the grill assembly and in counter clockwise direction to lower the grill assembly.

According to an embodiment herein, the grill assembly height is adjusted by a desired amount for a pre-specified number of turns on the load screw in clockwise or counter clockwise direction.

According to an embodiment herein, the post mounted grill assembly further comprises a reinforcing pipe welded between the bottom of the cooking frame and to the bottom of the mounting frame. Alternately, a piece of channel is welded to the bottom of the pipe and the cooking frame is bolted to the pipe using (⅜") bolts through the channel and through the (1 inch) square tubing(s) that is welded to the cooking frame.

According to an embodiment herein, the post mounted grill assembly is configured for enabling the user to dismantle the post mounted grill assembly by lifting off the grill assembly from the ground embedded post. Dismantling of the grill assembly form the embedded post provides an unobstructed access of a campfire to the user except the post buried in the ground.

According to an embodiment herein, the dimensions of the post mounted grill assembly are configurable or scalable according to user requirement.

According to an embodiment herein, a method of using the post mounted grill assembly is provided. The method comprises the steps of setting up a grill assembly resting on top of a ground embedded post. The grill assembly comprises a pipe, a load screw and a cooking frame. The method also comprises adjusting height of the grill assembly over the post by turning the load screw in clockwise direction to raise the grill assembly and in counter clockwise direction to lower the grill assembly. The method further comprises swiveling the grill assembly in either direction using a second handle attached to the pipe for loading fuel to the cooking fire/campfire, for turning over food that is cooking. The method still further comprises returning the cooking assembly back to the campfire using the second handle to resume cooking and dismantling the grill assembly by lifting the grill assembly off the embedded post on completion of cooking.

According to an embodiment herein, the step of setting up a grill assembly resting on top of a ground embedded post further comprises sliding over the bottom end of the pipe onto the upper end of the ground embedded post.

FIG. 1A illustrates a side view of a post mounted grill assembly, according to one embodiment herein. With respect to FIG. 1A, the post mounted grill assembly comprises the post 102 for vertical mounting. The post comprises the lower ground penetrating end 104 and the upper end 106. The upper end 106 of the post 102 is closed off by welding the cap 108. The lower ground penetrating end 104 of the post 102 is embedded in the ground.

According to an embodiment herein, the post mounted grill assembly further comprises the grill assembly 110 configured for resting on top of the ground embedded post 102. The grill assembly 110 comprises a pipe 112, a load screw 114 and a cooking frame 116. The pipe 112 comprises the washer 118 welded onto the top end of the pipe 120. The nut 122 is welded onto the washer 118 with one or more threads of the nuts 122 lined up with an opening in the washer. The pipe 112 is configured for sliding onto the upper end of the post 106 from the bottom end of the pipe 124.

According to an embodiment herein, the load screw 114 is affixed to the top end of the pipe 120. The load screw 114 is configured for allowing the user to adjust the height of grill assembly by turning the load screw 114 in clockwise direction to raise the grill assembly and in counter clockwise direction to lower the grill assembly. The grill assembly height is adjusted by a desired amount for a pre-specified number of turns on the load screw 114 in clockwise or counter clockwise direction.

According to an embodiment herein, the first handle 128 is welded onto top end of the load screw 126 in a perpendicular fashion. The wooden handle 130 is affixed to the open end of the first handle 128 using the bolt 132. The wooden handle comprises of a wooden dowel. The bolt 132 is configured for passing through the wooden dowel for attaching the wooden dowel to the first handle 128. The wooden dowel is configured for spinning around the bolt 132.

Figure 2:
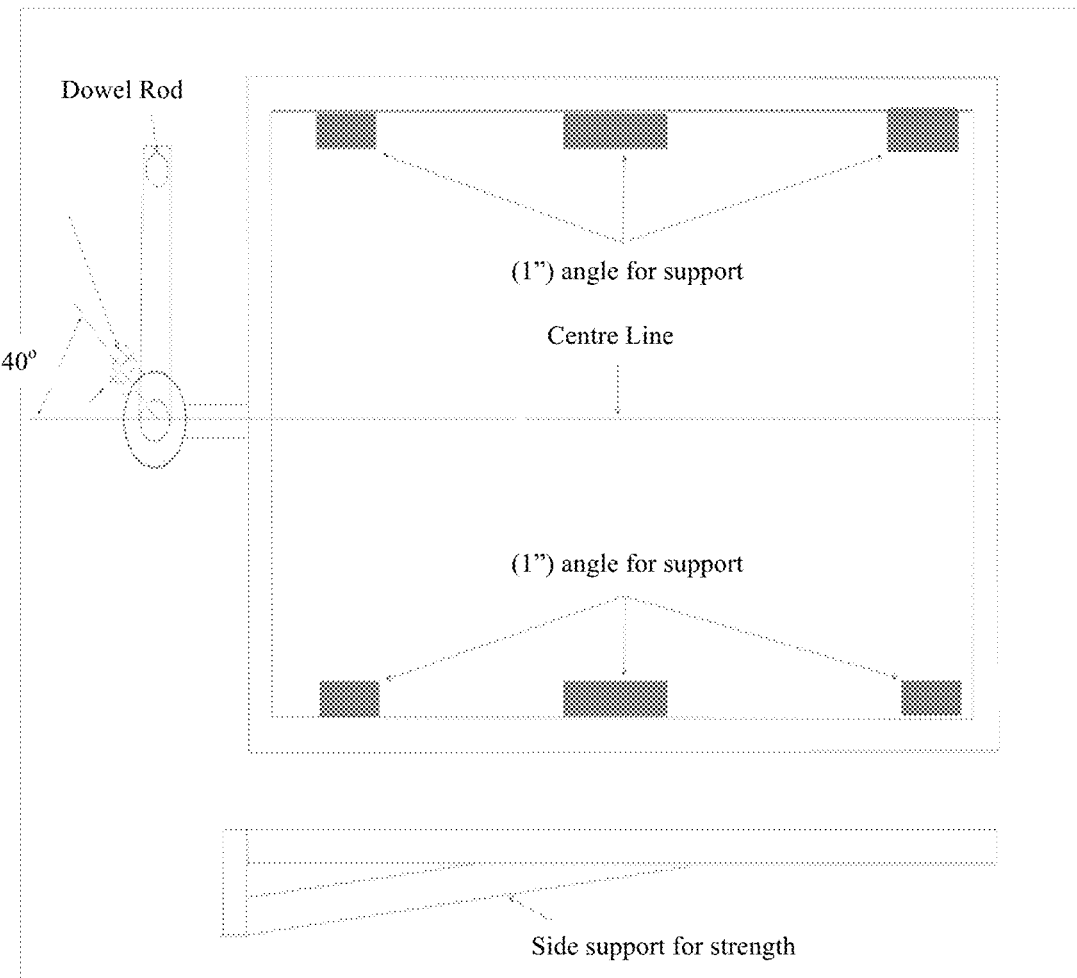
FIG. 2 illustrates a top view of the post mounted grill assembly, according to one embodiment herein.

According to an embodiment herein, the post mounted grill assembly further comprises the second handle 134 attached to the pipe 112. The second handle 134 is configured for allowing the user to swivel the grill assembly towards or away from the campfire as per requirement. The second handle 134 is mounted onto the pipe 112 at a 40 degree angle from the center line of the cooking grill as shown in FIG. 2. The grill assembly is configured for rotating 360 degrees in either direction using the second handle 134. The second handle 134 is foldable when not in use. As shown in FIG. 2, six pieces of angles (made of iron) 202 are welded to the inside of the cooking frame to support the cooking grill. In one example embodiment 1 inch wide pieces of angle made of iron are used for this purpose.

According to an embodiment herein, the second handle 134 is attached to the pipe 112 using either two welded steel tabs with 5/16 inch holes drilled in them that the handle is bolted between or a piece of channel iron with a 5/16 inch hole drilled through the sides welded to the pipe 112 and the second handle 134 is attached by a 5/16 inch bolt through the holes in the channel and through a 5/16 inch hole drilled in the 1 inch square tubing handle. The second handle 134 is welded on the rear left side for right handed people or the rear right side for left handed people. The second handle 134 is the handle that is attached to the load screw 114 that raises and lowers the cooking assembly. In one example embodiment, this handle is a piece of 1 inch wooden dowel rod with a 7/16 inch hole drilled through the middle of it vertically. The mounting bolt is a 3/8 inch bolt with a 3/8 inch washer on each end of the dowel rod and a lock nut attaching it to the handle.

According to an embodiment herein, the cooking frame 116 is attached to the bottom end of the pipe 124. The cooking frame 116 is constructed using the rectangular frame 136 of a plurality of square tubings. The cooking frame 116 is welded to the lower end of the pipe 124 using one or more short sections of square tubings 138 welded between the cooking frame 116 and the pipe 112. The reinforcing pipe 140 is welded to the bottom of the cooking frame 116 and to the bottom of the mounting frame. The cooking frame 116 is configured for holding a cooking grill (not shown).

According to an embodiment herein, the dimensions of the post mounted grill assembly are configurable according to user requirement. Extra support pieces are attached to the cooking frame when large cooking area is provided. The length of the square tubings that attaches the grill assembly to the pipe is also configurable. In one example embodiment, the grill assembly is used with a truck rim as a fire ring. This grill does not need a very long square tubing to attach the grid to the carrier pipe since the thickness of the truck rim is not very thick. However, when the fire ring is made out of barn stones which are up to 2 feet thick, the configuration of the grill assembly need to be different and requires a larger cooking area. Hence, a longer square tubing 138 is needed to mount the grill assembly on the pipe to get the cooking assembly past the wide barn stones and get the cooking area over the fire.

According to an embodiment herein, the grill assembly is made up of heavy wall pipe and heavy wall square tubings of steel material. Further the post mounted grill assembly 100 enables the user to dismantle the post mounted grill assembly by lifting off the grill assembly from the ground embedded post 102. Dismantling of the grill assembly form the embedded post 102 provides an unobstructed access of the campfire to the user other than the post buried in the ground.

According to an embodiment herein, a 2¼ inch diameter heavy wall pipe that is 4 feet in length is used for the post. One end of the pipe is closed off by welding a 2 inch cap onto the end of the pipe. The pipe is then embedded in the ground up to 2 feet with 2 feet still above ground. The open end is on the end that is buried and the closed end is above the ground. The load screw in the grill assembly rests on top of the closed end of the pipe that is above ground.

Figure 1B:
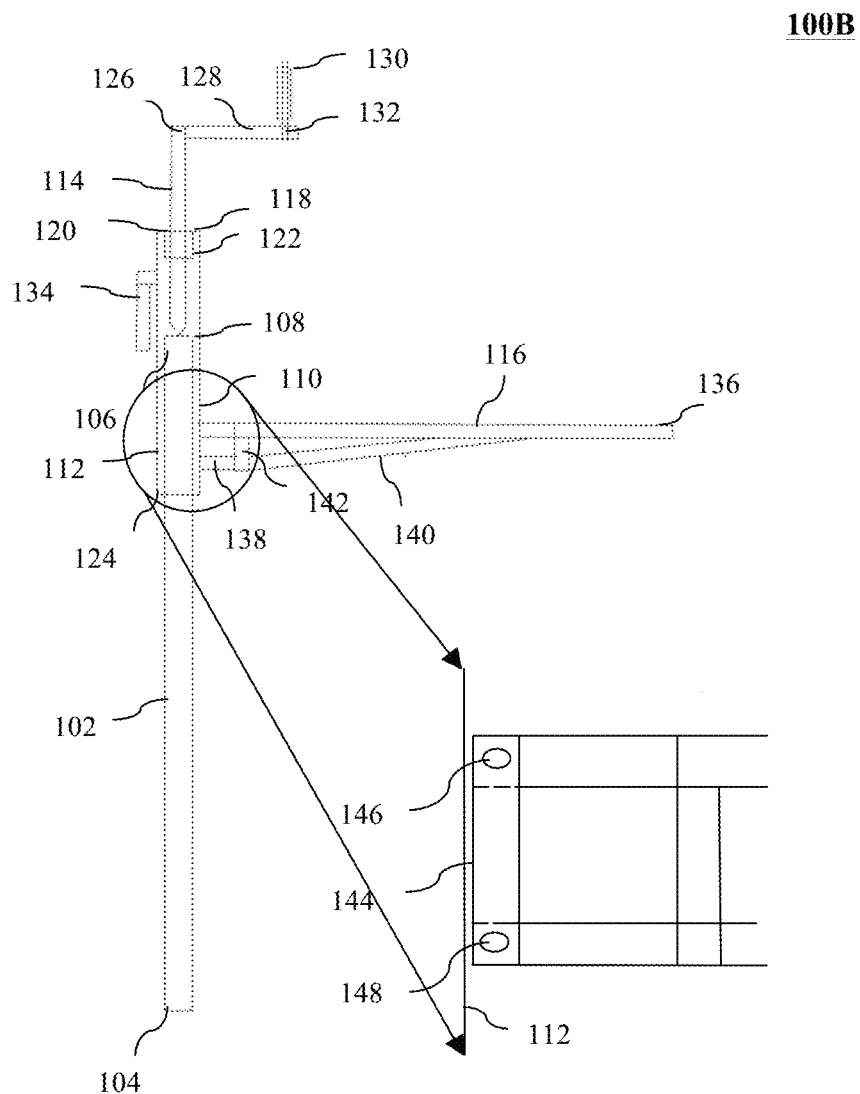
FIG. 1B illustrates a side view of a post mounted grill assembly with cooking frame attached to the post through a channel welded to the post, according to one embodiment herein.

According to an embodiment herein, the grill assembly comprises a 2¾ inch diameter heavy wall pipe that is 19 inch long. This pipe has a 1 inch nut welded onto a 2¾ inch washer with the threads of the nuts lined up with the opening in the washer. This washer is then welded onto one end of the 19 inch pipe closing one end of the pipe. The next piece of the assembly is a 1 inch diameter screw that is 15 inch long. This screw has an 8 inch 1 inch square tubing handle welded to one end of the screw at a 90 degree angle. A 4½ inch wooden handle is attached on the other end of this square tubing with a ⅜ bolt through the wooden dowel and is attached to the square tubing allowing the dowel to spin on the ⅜ bolt. This allows the grill to be adjusted up and down by turning the load screw either clockwise to raise the grill and counter clockwise to lower the grill. The grills height is either raised or lowered 1 inch for every 8 turns on the load screw. The next part of the grill assembly is a rectangle made out of 1 inch square tubing that is 30¼ inch×19¾ inch and is scalable to user specifications. The cooking grill itself is 17¼ inch×28 inch and is scalable to user specifications and is made up of stainless steel or cast iron. The square tubing frame is welded to bottom of the 19 inch long 2¾ inch tube mentioned above. The rectangular frame is welded to the pipe using short sections (scalable based on user specifications) of 1 inch square tubing that is welded to the rectangular frame and the pipe. Alternately, a piece of channel 144 is welded to the bottom of the pipe 112 and the cooking frame is bolted to the pipe using two ⅜" inch bolts 146 and 148 through the channel and through the 1 inch square tubing(s) that is welded to the cooking frame (as shown in FIG. 1B). Second 1 inch square tubing 142 (as shown in FIGS. 1A and 1B) is welded to the bottom of the rectangular frame with a 1 inch piece of 1 inch square tubing between them. A reinforcing pipe with 1 inch diameter and 20 inch long is welded to the bottom of the rectangular frame and to the bottom of the mounting frame.

According to an embodiment herein, the grill assembly is mounted on the buried post by sliding over the pipe. The grill assembly rests on top of the buried pipe with the 15 inch-1 inch load screw threaded through the closed end on the top of the pipe with the welded washer and nut. The grill assembly rests entirely on the end of the load screw which is threaded through the nut and is resting on top of the buried pipe.

Figure 3:
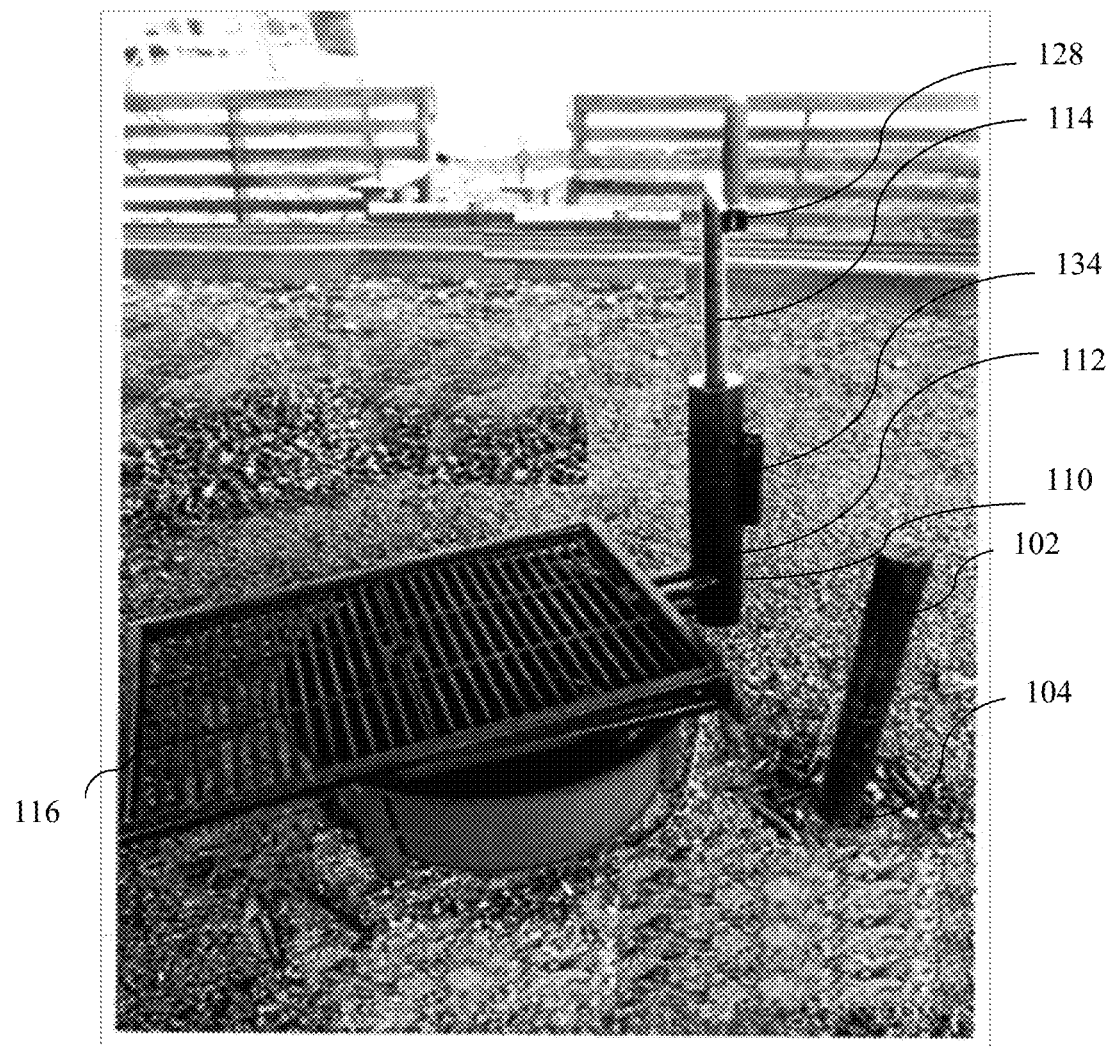
FIG. 3 illustrates top side perspective view of the grill assembly and the campfire, according to one embodiment herein.

FIG. 3 illustrates an image depicting the post, the grill assembly and the campfire, according to one embodiment herein. With respect to FIG. 3, the post 102 embedded in the ground at the lower ground penetrating end 104 is shown. Further, the grill assembly 110 comprising of pipe 112, load screw 114, folded second handle 134, first handle 128 and the cooking frame 116 is also shown.

Figure 4:
FIG. 4 illustrates a top side perspective view of the post mounted grill assembly placed over a campfire, according to one embodiment herein.

FIG. 4 illustrates an image depicting the post mounted grill assembly placed over a campfire, according to one embodiment herein. With respect to FIG. 4, the post mounted grill assembly placed over a campfire is shown. As mentioned earlier, the post mounted grill assembly dimensions are configurable based on user requirement. Variety of food and cooking pots are placed on the cooking grill based on the weight carrying capacity of the grill assembly 110.

Figure 5:
FIG. 5 illustrates a side view of the post mounted grill assembly for rotating the grill assembly, according to one embodiment herein.
Figure 6:
FIG. 6 illustrates a side view of swiveling of the grill assembly in counter clockwise direction using the handle, according to one embodiment herein.

FIG. 5 illustrates an image depicting a second handle provided in the post mounted grill assembly, according to one embodiment herein. With respect to FIG. 5, the user grasps the second handle 134 that is attached to the carrier pipe 112 and swings it to the up position. The user then uses handle 134 to swivel the grill assembly clockwise or counter clockwise for the desired amount in order to load more fuel to the cooking fire or turn over food that is cooking and then return the cooking assembly to the fire to resume cooking. The swiveling of the grill assembly in counter clockwise direction using the second handle 134 is depicted in FIG. 6. The user then returns this handle to the down position so that it no longer obstructs the operation.

Figure 7:
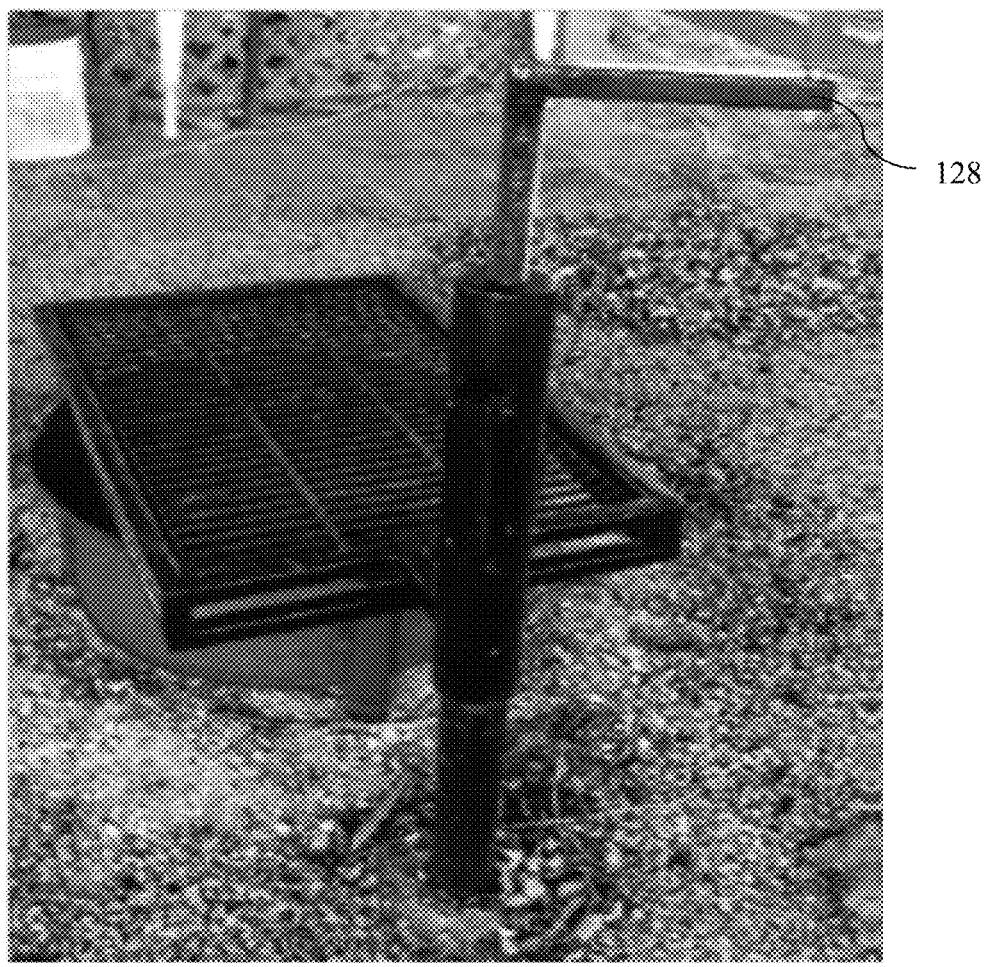
FIG. 7 illustrates a back view of the post mounted grill assembly, according to one embodiment herein.

FIG. 7 illustrates an image depicting a back view of the post mounted grill assembly, according to one embodiment herein. With respect to FIG. 7, the user grasps the wooden handle attached to the load screw 114 with the opposite hand and turns the load screw 114 in a clockwise or counter clockwise direction. In one example embodiment, the user needs to stop every three rotations of the screw with the first handle 128 pointing directly toward the user and pull the handle attached to the load screw directly toward the user. Then resume turning the load screw 114 in a counter clockwise direction stopping every three turns to pull the assembly toward the user until the desired height is reached. The reason for stopping and pulling the assembly toward the user is to keep the carrier pipe 112 from "hanging up" on the base pipe and thereby not lower the assembly even when the screw is turned in the counter clockwise direction.

Figure 8:
FIG. 8 illustrates a front view of the post mounted grill assembly, according to one embodiment herein.

FIG. 8 illustrates an image depicting a front view of the post mounted grill assembly, according to one embodiment herein. With respect to FIG. 8, the post mounted grill assembly is shown placed over a campfire.

Figure 9:
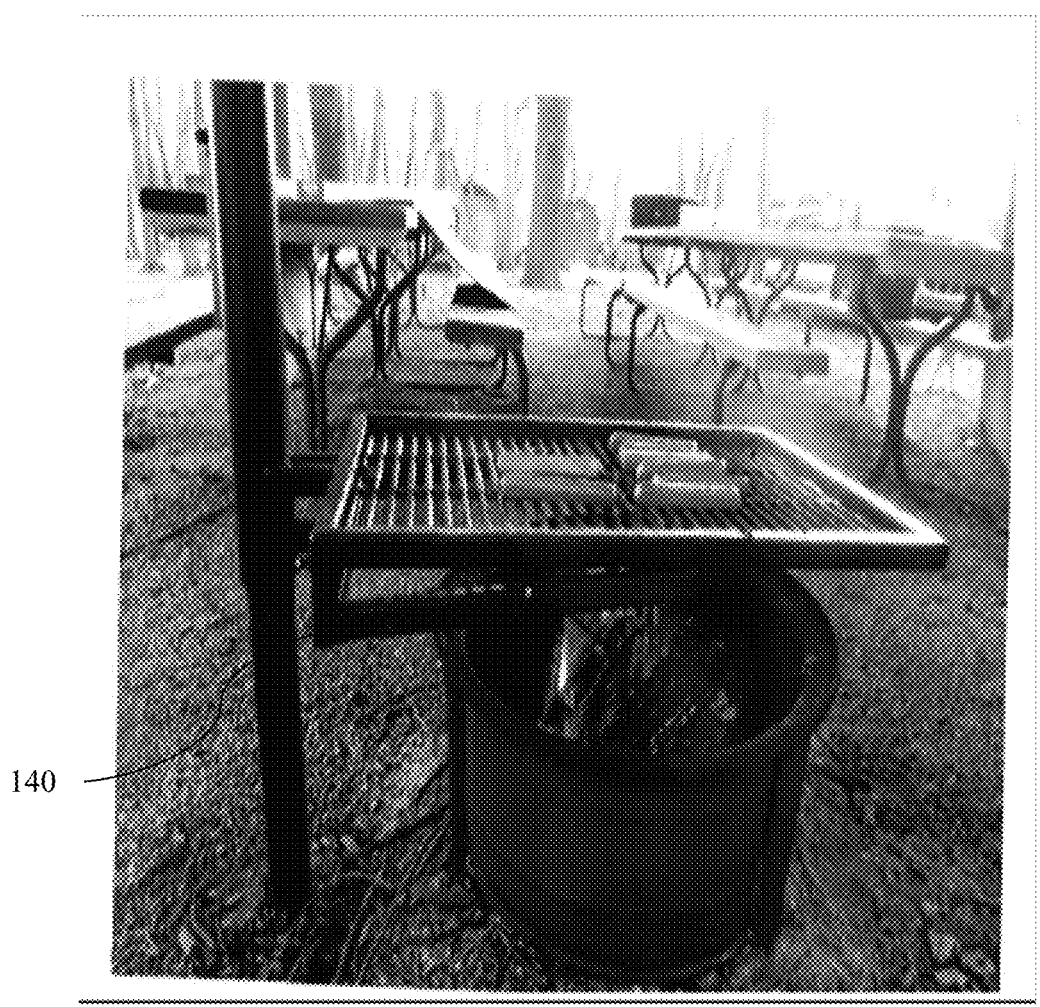
FIG. 9 illustrates a side view of the post mounted grill assembly with reinforcement pipe, according to one embodiment herein.

FIG. 9 illustrates an image depicting side view of the post mounted grill assembly, according to one embodiment herein. With respect to FIG. 9, the reinforcing pipe 140 is shown.

Figure 10:
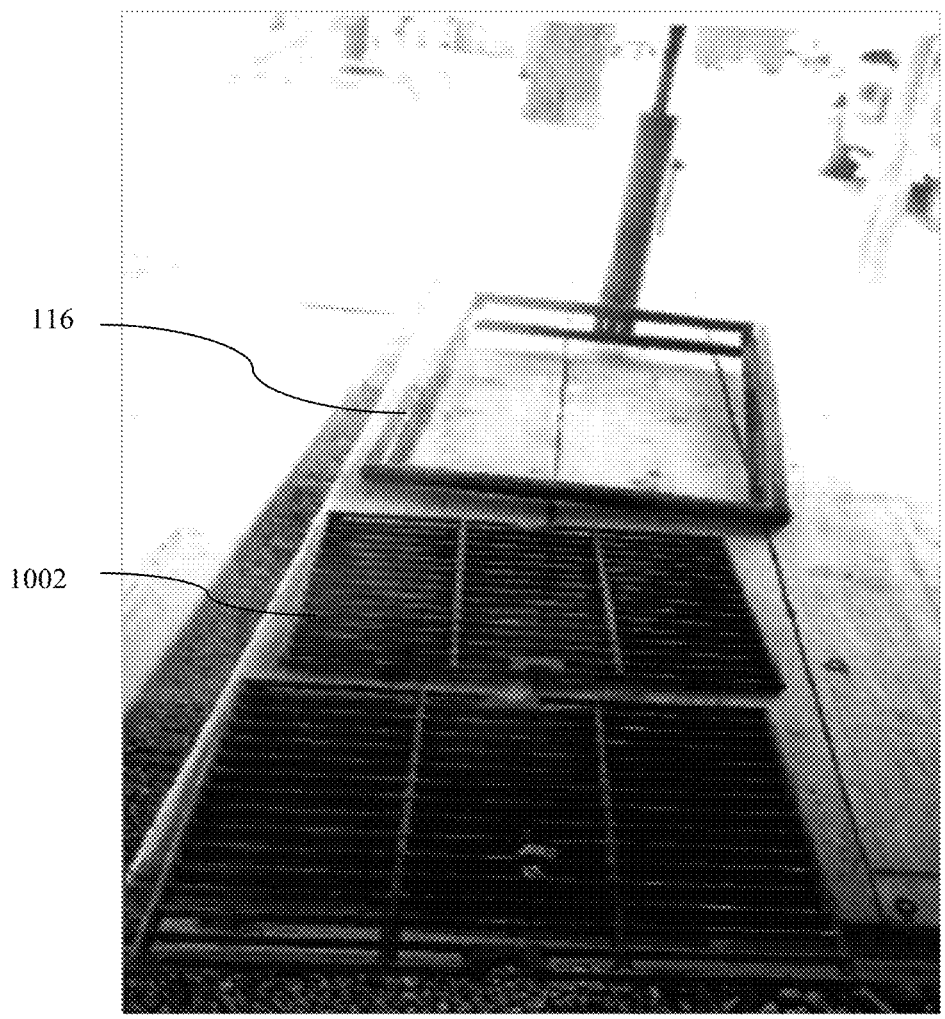
FIG. 10 illustrates an exploded assembly view of the post mounted grill assembly in dismantled condition, according to one embodiment herein.

FIG. 10 illustrates an image depicting various parts of the post mounted grill assembly in dismantled condition, according to one embodiment herein. With respect to FIG. 10, various parts of the post mounted assembly are seen such as cooking frame 116 and cooking grill 1002.

Therefore, the post mounted grill assembly is designed to be used in places with permanent campsites. The post mounted grill assembly is a heavy duty grill as compared to grill assemblies currently available in market and hence is strong enough to handle as much food (e.g. meat or vegetables) that are load onto it. The assembly is also capable of accommodating large pots. The grill assembly is easy to spin 360 degrees in either direction and is height adjustable by turning the load screw in either direction. Thus, the food is easily rotatable away from the fire for safely turning food over and then spinning the grill back over the fire to continue cooking. The spinning away of the grill also provides full access to add or stir the coals in the fire pit. Further, the grill assembly is easy to dismantle by simply lifting it off the buried post and setting it aside thereby leaving the campfire completely unobstructed other than the post buried in the ground.

Thus, the grill assembly facilitates the user to raise, lower, or swivel the cooking surface without touching it thereby reducing the chances of burns.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be the to fall there between.

What is claimed is:

1. A post mounted grill assembly, the post mounted grill assembly comprising:
   a post for vertical mounting, and wherein the post comprises a lower ground penetrating end and an upper end, and wherein the upper end of the post is closed by welding a cap, and wherein the lower ground penetrating end of the post is embedded in the ground;
   a grill assembly configured for resting on top of the ground embedded post, and wherein the grill assembly comprises:

a pipe comprising of a washer welded onto a top end of the pipe, and wherein a nut is welded onto the washer with one or more threads of the nuts lined up with an opening in the washer, and wherein the pipe is configured for sliding onto the upper end of the post from a bottom end of the pipe;

a load screw fastened to the nut at the top end of the pipe, and wherein a first handle is welded onto one end of the load screw in a perpendicular fashion, and wherein a wooden handle is affixed to the open end of the first handle using a bolt; and a cooking frame attached to the lower end of the pipe, and wherein the cooking frame is constructed using a rectangular frame of plurality of square tubings, and wherein the cooking frame is welded to the bottom end of the pipe using one or more short sections of square tubings welded between the cooking frame and the pipe, and wherein the cooking frame is configured for holding a cooking grill.

2. The post mounted grill assembly according to claim 1, wherein the post mounted grill assembly further comprises a second handle attached to the pipe, and wherein the second handle is configured for allowing the user to swivel the grill assembly towards or away from the fire as per requirement.

3. The post mounted grill assembly according to claim 2, wherein the second handle is mounted onto the pipe at a 40 degree angle from a center line of the cooking grill.

4. The post mounted grill assembly according to claim 2, wherein the grill assembly is configured for rotating 360 degrees in either direction using the second handle.

5. The post mounted grill assembly according to claim 2, wherein the second handle is foldable when not in use.

6. The post mounted grill assembly according to claim 1, wherein the bolt is configured for passing through the wooden dowel for attaching the wooden dowel to the first handle, and wherein the wooden dowel is configured for spinning around the bolt.

7. The post mounted grill assembly according to claim 1, wherein the load screw is configured for enabling the user to adjust the height of grill assembly by turning in clockwise direction to raise the grill assembly and in counter clockwise direction to lower the grill assembly.

8. The post mounted grill assembly according to claim 7, wherein the grill assembly height is adjusted by a desired amount for a pre-specified number of turns on the load screw in clockwise or counter clockwise direction.

9. The post mounted grill assembly according to claim 1, further comprises a reinforcing pipe welded between the bottom of the cooking frame and to the bottom of the mounting frame.

10. The post mounted grill assembly according to claim 1, wherein the post mounted grill assembly is configured for enabling the user to dismantle the post mounted grill assembly by lifting off the grill assembly from the ground embedded post, and wherein dismantling of the grill assembly form the embedded post provides an unobstructed access of a campfire to the user except for the pipe that the grill assembly sits on.

11. The post mounted grill assembly according to claim 1, wherein the dimensions of the post mounted grill assembly are configurable according to user requirement.

\* \* \* \* \*